US008006501B2

(12) United States Patent
Dusserre-Telmon et al.

(10) Patent No.: US 8,006,501 B2
(45) Date of Patent: Aug. 30, 2011

(54) DEVICE FOR DRIVING THE ROTOR OF TURBINE ENGINE AUXILIARY

(75) Inventors: Guy Frank Paul Dusserre-Telmon, Sivry-Courtry (FR); Jean Pierre Galivel, Savigny le Temple (FR); Zoltan Zsiga, Avon (FR)

(73) Assignee: Smecma, Paris (FR)

( * ) Notice: Subject to any disclaimer, the term of this patent is extended or adjusted under 35 U.S.C. 154(b) by 1024 days.

(21) Appl. No.: 11/839,162

(22) Filed: Aug. 15, 2007

(65) Prior Publication Data
US 2008/0053257 A1    Mar. 6, 2008

(30) Foreign Application Priority Data
Aug. 29, 2006   (FR) ...................................... 06 53508

(51) Int. Cl.
*F02C 6/00*     (2006.01)
*F16H 37/00*    (2006.01)

(52) U.S. Cl. ............................................ 60/802; 74/11

(58) Field of Classification Search .................... 60/802, 60/788, 786; 74/11, 650, 7 R, 7 B, 15.5, 74/15.63; 384/494
See application file for complete search history.

(56) References Cited

U.S. PATENT DOCUMENTS

| 2,803,943 | A | 8/1957 | Rainbow |
| 4,743,776 | A | 5/1988 | Baehler et al. |
| 6,676,379 | B2 * | 1/2004 | Eccles et al. ............. 416/170 R |
| 7,023,219 | B2 * | 4/2006 | Davis et al. .................. 324/545 |
| 7,055,330 | B2 * | 6/2006 | Miller .............................. 60/792 |
| 7,144,349 | B2 * | 12/2006 | Mitrovic ....................... 475/331 |
| 2004/0003968 | A1 * | 1/2004 | Rakhmailov ................. 184/6.11 |
| 2005/0284150 | A1 * | 12/2005 | Dittmar et al. .................. 60/788 |
| 2006/0107787 | A1 | 5/2006 | Herlihy et al. |

FOREIGN PATENT DOCUMENTS

| EP | 0 769 631 A1 | 4/1997 |
| WO | WO 01/27444 A1 | 4/2001 |

* cited by examiner

*Primary Examiner* — Ehud Gartenberg
*Assistant Examiner* — Young Choi
(74) *Attorney, Agent, or Firm* — Oblon, Spivak, McClelland, Maier & Neustadt, L.L.P.

(57) ABSTRACT

A device for driving the rotor of an auxiliary is mounted on a turbine engine auxiliaries support which includes a pinion for driving the rotor shaft. The device includes a tubular shaft driven by the pinion and supported by a first bearing (18) and a second bearing (19) which are secured to the auxiliaries support (10). The rotor shaft is coaxial with the tubular shaft and a splined coupling portion formed between the rotor shaft and the tubular shaft. By virtue of the invention, mechanical loads of the auxiliary are transmitted to a lesser extent to the rotor shaft support bearings and to the auxiliaries support gear train.

12 Claims, 3 Drawing Sheets

DEVICE FOR DRIVING THE ROTOR OF TURBINE ENGINE AUXILIARY

BACKGROUND OF THE INVENTION

The invention relates to the field of gas turbine engines and is aimed at driving an auxiliary, particularly an electric generator, mounted on an auxiliaries support.

A turbine engine comprises an auxiliaries support, known as the accessory drive gearbox assembly. The gearbox assembly comprises a number of auxiliaries, such as alternators, fuel and oil pumps, a starter and various other items. These are mechanically driven by a shaft of the turbine engine, generally by the shaft of the high-pressure spool in the case of a twin-spool turbojet.

In a turbojet, among these auxiliaries there are at least two alternators, one of which supplies the electrical power to the aircraft propelled by the turbojet and the other of which supplies the electrical power necessary for operating the turbojet itself, which is smaller than the first one. This latter alternator is generally a dynamo electric machine or permanent magnet alternator known by those skilled in the art as a PMA. In the remainder of the description, it will be termed the alternator. The alternator in particular supplies the electrical power needed for operating the turbojet control and regulation device known as the FADEC (which is the acronym for "full authority digital engine control" as it is usually termed by those skilled in the art).

The alternator rotor rotates at a very high speed, typically 18000 to 30000 revolutions per minute. At the present time, the loads (mechanical, electromechanical, etc. loads) to which the alternator is subjected during operation are not very well known. Furthermore, this alternator is frequently removed, then refitted for maintenance purposes. For this, the rotor is first of all mounted on its shaft in the gearbox assembly then the stator is bolted onto the gearbox assembly, around the rotor.

DESCRIPTION OF THE PRIOR ART

Reference is made to FIG. 1 which depicts a device for driving an alternator rotor of the prior art. This alternator rotor comprises a shaft 1, comprising an end portion 2 supporting the inductor elements (not depicted) rotating inside the stator (armature), not depicted, of the alternator. This shaft 1 is driven by a gear 3 of the accessory drive gearbox assembly which is itself driven, either directly or indirectly, off the turbojet via a power take-off shaft. This shaft 1 is also supported by two bearings 4, 5 secured to a fixed structure of the accessory drive gearbox assembly. The alternator stator is fixed to the structure in such a way that it can be removed independently of the rotor. The rotor is thus mounted cantilever-fashion in the stator.

The rotor shaft bearings are small because, in the absence of loads introduced through the running of the alternator (when the alternator is properly balanced), the rolling elements (balls or rollers) of a large-sized bearing would have a greater tendency, not to roll along their raceways, but to slide thereon, because of the inertia that these components have when they are large in size; because of such slippage, the bearings may become damaged and break, and this occurs all the more readily if the circulation of oil is poor. Smaller-sized bearings are subjected to relatively higher loads and therefore are less at risk of sliding when the alternator is properly balanced and the loads are light.

Now, since the alternator is frequently removed then refitted for maintenance, it is possible that inattention during the fitting stage will lead to out-of-balance loads, that are great at high speed, on the alternator rotor shaft that is mounted cantilever-fashion. The magnetic imbalance of the alternator may also combine with these loads. Because of their small size and their low load-bearing capability, there is a risk that these bearings will, in this case too, become damaged, and all the more easily if the flow of oil between the alternator and the accessory drive gearbox assembly is poor. In addition, loads, jerks and imbalances are transmitted to the gears of the accessory drive gearbox through the accessory drive gearbox gear 3, and this is not desirable.

There is therefore a stumbling block as regards the sizing of the alternator rotor shaft support bearings: if they are large in size, there is a risk that they will perish because of slippage under normal operation when the alternator line is properly balanced, and if they are small in size, there is a risk that they will break as a result of unpredictable (and not well known) heavy loads, and these loads are transmitted to the gears of the accessory gearbox assembly.

To solve this problem, one idea was to change the bearings, namely two bearings of the roller bearing type, or one roller bearing and one ball bearing in one configuration or the reverse configuration. None of these combinations yielded satisfactory results.

SUMMARY OF THE INVENTION

The present invention aims to propose a device for driving the alternator rotor and, more generally, an auxiliary which avoids or at the very least reduces the transmission of mechanical loads from the alternator to the rotor shaft support bearings and to the auxiliaries support gear train.

To this end, the invention relates to a device for driving the rotor of an auxiliary, mounted on a turbine engine auxiliaries support which comprises means for driving the rotor shaft, which device comprises a tubular shaft driven by one of said means and supported by a first bearing and a second bearing which are secured to the auxiliaries support, the rotor shaft being coaxial with the tubular shaft and a rotational-coupling means being formed between the rotor shaft and the tubular shaft.

A rotational-coupling means is to be understood as meaning a coupling or connecting means which applies only tangential forces to the rotor shaft, that is to say forces that are perpendicular to its axis of rotation. The rotor shaft is thus coupled to the tubular shaft more or less coaxially and rotationally driven thereby. This may, for example, be a splined connection, or alternatively a connection involving complementary flats (for example a prismatic shaft), a key and keyway, or any other means of tangential connection. A rotational-coupling means such as this allows a certain degree of freedom of movement between the tubular shaft and the rotor shaft, in the longitudinal direction and in pivoting. The connection between the rotor shaft and the shaft thus exhibits a certain degree of flexibility.

By virtue of the invention, the rotor is not secured directly to the auxiliaries support drive means or accessory drive gearbox assembly, and does not transmit thereto the loads, jerks or vibrations to which it may itself be subjected. Certain vibrations are taken up in the rotational-coupling means, the structure of which intrinsically absorbs such vibrations thanks to the flexibility in directions other than the tangential direction. Thus, the rotor shaft and the means of driving the accessory gearbox assembly, that is to say the rotor shaft and the gear train of the accessory drive gearbox assembly are decoupled thanks to the presence of the tubular shaft. The presence of such a rotational-coupling means gives the assembly formed by the alternator rotor shaft and the tubular shaft a certain degree of flexibility.

The invention is particularly applicable to cases where the auxiliary is an alternator mounted cantilever-fashion and comprising a stator fixed to the auxiliaries support. Indeed it was in this context that the problem solved by the invention initially arose, in as far as the rotor, on the one hand, and the stator, on the other, are mounted on the accessory gearbox assembly and have to be removed and refitted frequently, their relative positioning with respect to one another being dependent on their relative positioning on the accessory drive gearbox assembly. However, the scope of the invention should not be restricted to this auxiliary alone.

In the preferred embodiment of the invention, the rotor shaft is supported by at least one third bearing which is secured to the auxiliaries support. Loads on the rotor can thus be taken up in their entirety by the third bearing, supporting the rotor shaft, and be transmitted to the fixed structure of the auxiliaries support. A bearing such as this exclusively reacts the loads of the alternator rotor but not that associated with the gears of the accessory drive gearbox assembly. In the preferred embodiment of the invention, the rotational-coupling means is a connection of the splined type. A coupling means such as this is easy to use: it is easy to insert the rotor shaft, which has splines, into the tubular shaft, which has complementary splines.

In a preferred embodiment of the invention, the third bearing, which is the alternator rotor shaft support bearing, is a ball bearing and comprises lubricant drainage means on its outer ring.

An embodiment such as this affords the following advantage: because of the drainage means, the risk that the balls of the bearing will slip on the outer ring is reduced, making it possible to use a larger size of bearing better able to withstand the loads.

As a preference, in this case, the third bearing is what is known as a three-point contact or four-point contact bearing.

As a preference, oil-film damping means are arranged on the outer ring of the third bearing.

As a preference too, and according to a preferred embodiment of the invention, the first bearing and the second bearing which are tubular shaft support bearings are smaller in size than the third bearing, which is an alternator rotor shaft support bearing.

Thus, the respective advantages of large and small bearings can be combined. Small bearings are able to withstand the light loads generated by the gear train of the accessory gearbox assembly under normal operation. Furthermore, the large bearing is more readily able to absorb any loads that might be due to poor balancing, particularly if the alternator is removed and refitted inaccurately, any slippage in the large bearing also being avoided because of the lubricant drainage means, in the case of proper balancing.

Preferably also, and with a view to reducing the risks of imbalance and overheating, a brush seal may be provided, adjacent to the third, alternator rotor shaft support, bearing, on the same side as the alternator.

Thus, the seal between the alternator rotor drive device and the alternator itself is a better one, thus avoiding the ingress of oil into the alternator and the ensuing imbalance, as will be explained later on.

Preferably also, the alternator rotor shaft may comprise a weakened portion designed as a deliberate weak link, so that it will rupture if excessive loads are applied to the rotor, thus preventing these loads from being transmitted to the gears of the accessory drive gearbox assembly.

The invention also relates to an auxiliaries support, or accessory drive gearbox assembly, comprising the above drive device, and to a turbojet comprising such a gearbox assembly.

BRIEF DESCRIPTION OF THE DRAWINGS

The invention will be better understood with the aid of the following description of some preferred embodiments of the device of the invention, given with reference to the attached drawings, in which.

DESCRIPTION OF THE PREFERRED EMBODIMENTS

In the various embodiments depicted, elements that are common are denoted by the same references.

Figure 1:
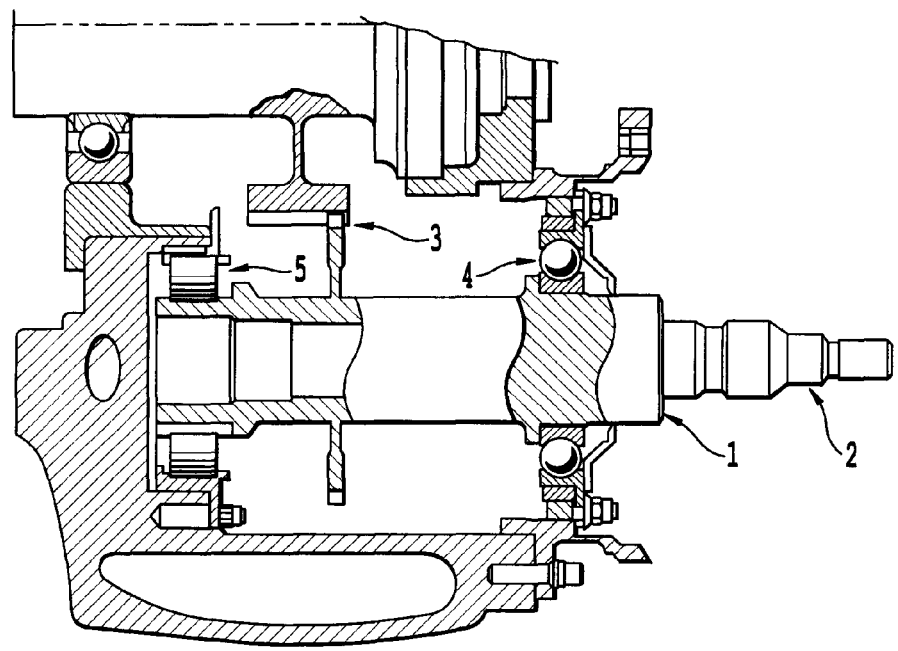
FIG. 1 depicts a schematic cross section of a drive device of the prior art.
Figure 2:
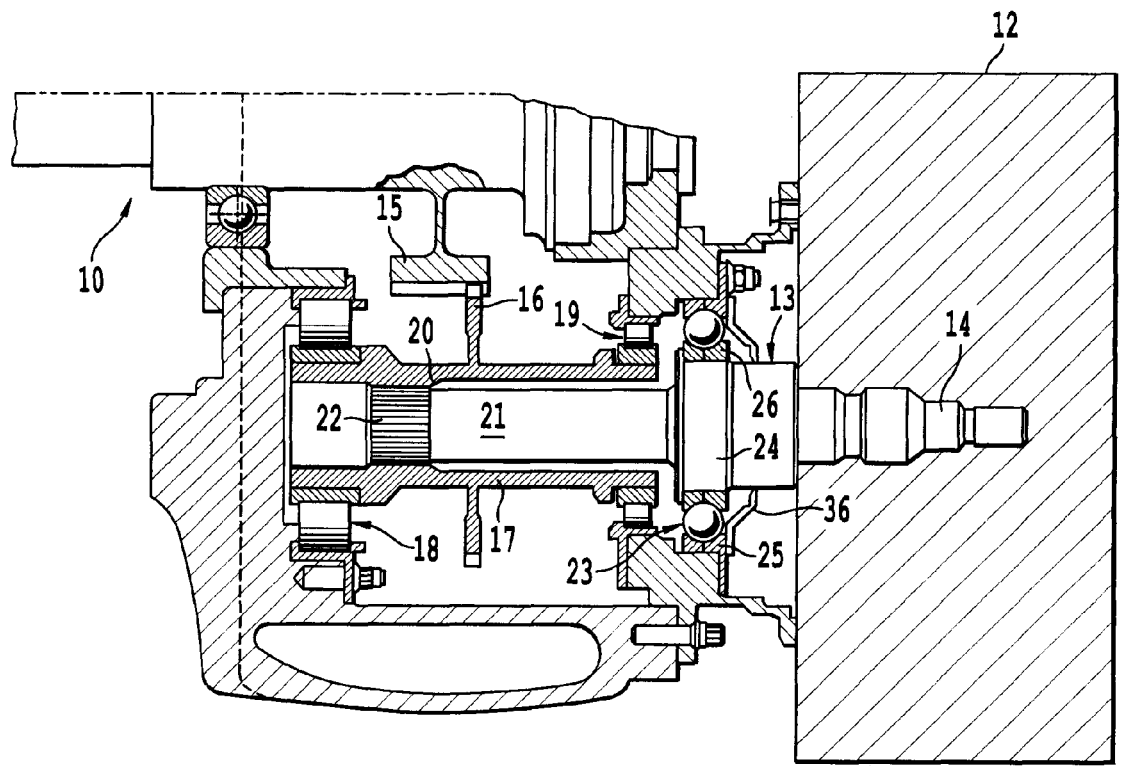
FIG. 2 depicts a schematic cross section of a first embodiment of the device of the invention.

With reference to FIG. 2, a turbojet comprises an auxiliaries support 10, or accessory drive gearbox assembly 10, for which the abbreviation, well known to those skilled in the art, is AGB, and as outlined above, hereinafter termed gearbox 10. The gearbox 10 is fixed to the periphery of the turbojet; for example, in the case of a bypass turbojet, it is fixed to the outer casing of its fan. The turbojet comprises, on the high-pressure shaft, power take-off means meshing with a shaft connected to the gearbox 10, which will be termed the power take-off shaft. This shaft, which therefore extends radially between the high-pressure shaft of the turbojet and the gearbox 10, is inserted inside the latter and mechanically drives a number of auxiliaries, or accessories, including an alternator 11 for the FADEC device, fuel and oil pumps, a starter, an alternator that generates electrical power for the airplane propelled by the turbojet, etc. For this, the gearbox 10 comprises a plurality of gears, connected directly or indirectly to the power take-off shaft that takes power off the high-pressure shaft of the turbojet, these gears being arranged in such a way as to drive the various accessories.

The alternator 11 comprises a stator 12, here depicted schematically as a shaded block, and a rotor, comprising a shaft 13, rotationally driven by the power take-off shaft and an end portion 14 of which extends inside the stator 12. This end portion 14 supports the elements of the inductor (not depicted) collaborating with the stator 12—armature—for producing electricity, in the known way. The rotor shaft 13 thus supports the rotor, rotating inside the stator. The alternator 11 here is of the permanent magnet alternator type. This is a relatively small-sized alternator, at least by comparison with the size of the alternator that generates the electricity for the airplane; the rotor rotates at high speed, typically 18000 to 33000 revolutions per minute. This rotational speed makes it possible to obtain a stable current and to use a small-sized alternator, thus limiting the amount of space it occupies.

The rotor shaft 13 here is formed as one piece with the rotor. Rotor and rotor shaft here then denote the same piece. It is also possible for the rotor shaft to form an independent piece, rotationally secured to the rotor by any appropriate means.

The gearbox 10 comprises a drive means 15 for the alternator 11, here a meshing means, in this instance a pinion 15, secured to a shaft connected to the gears of the gearbox and therefore connected, directly or indirectly, to the power take-off shaft.

The driving pinion 15 meshes with a gearwheel 16, or any other suitable drive means, secured to a tubular shaft 17. This tubular shaft 17 comprises, on a portion here optionally situated approximately midway along its length, the gearwheel 16. The tubular shaft 17 is supported, at each of its ends, by a first bearing and a second bearing 18, 19, respectively. These bearings 18, 19 in this instance are roller bearings but could equally be ball bearings. Roller bearings have the advantage of being able to withstand higher loads. The bearings 18, 19 are secured, by their outer ring, to a fixed structure of the gearbox 10. The tubular shaft 17 lies along the axis of the stator 12 of the alternator 11, that is to say along the axis of the rotor housing.

On a portion of its interior surface, preferably situated at the opposite end to the alternator 11, the tubular shaft 17 comprises a splined coupling or connecting portion 20. The splined coupling portion 20 comprises a collection of splines uniformly distributed about the axis of the tubular shaft 17, and thus forming grooves and ribs parallel to this axis.

Running concentrically to the tubular shaft 17 and inside the latter is the rotor shaft 13 of the alternator 11. The rotor shaft 13 comprises a shaft portion 21, at the opposite end to its end portion 14 inserted into the stator 12, that is designed to extend into the tubular shaft 17. At the end of this shaft portion 21, the rotor shaft 13 has a splined coupling portion 22 that complements the splined coupling portion 20 of the tubular shaft 17 and is designed to be connected thereto. The splined coupling portion 22 of the rotor shaft 13 is not depicted in section in the figure, but is shown in profile to assist with the understanding of the figure.

The splined coupling means 20, 22 form rotational-coupling means. What happens is that as the tubular shaft 17 rotates, the splines of this shaft 17 apply to the splines of the rotor shaft 13 forces that are tangential to the rotor shaft 13, perpendicular to its axis of rotation. In particular, the tubular shaft 17 does not apply any stresses in the longitudinal direction of the rotor shaft 13 or in pivoting. There is therefore a certain freedom of movement and a certain flexibility in the longitudinal direction and in terms of pivoting.

Between the end of the tubular shaft 17 closest to the alternator 11—in this instance, the end supported by the bearing 19—and the alternator itself, the rotor shaft 13 is supported by a bearing 23. This bearing 23 is secured by its outer ring 25, to a fixed structure of the gearbox 10. As a preference here, the bearing 23 is a ball bearing. It is coaxial with the tubular shaft 17.

In the preferred embodiment of the device of the invention, the rotor shaft 13 comprises a portion 24, supporting the internal ring 26 of the bearing 23, which is of widened diameter, by comparison with its shaft portion 21 extending into the tubular shaft 17. Extending from this widened portion 24, the rotor shaft 13 extends toward and into the stator 12 of the alternator 11, its portion 14 inserted into the stator 12 being of smaller diameter than the widened portion 24.

It will be noted that a deflector 36 is provided, against the bearing 23 that supports the rotor shaft 13 of the alternator 11, on the same side as the alternator 11. A deflector such as this prevents lubricant from this bearing 23, or even lubricant used to lubricate other parts of the drive device, from being thrown toward the alternator 11. What happens is that any oil present on the end portion 14 of the rotor shaft 13 that is inserted into the stator 12 of the alternator 11 causes imbalances in the rotor because, since the space between the rotor and the stator 12 is very small, the oil heats up and becomes coke. A deflector such as this may be a rotating deflector so as to improve its efficiency. The deflector 36 is in the form of a flange, the internal wall of which is flush with the rotor shaft 13 of the alternator 11 without contact therewith.

The way in which the device for driving the rotor shaft 13 of the alternator 11 works will now be described.

The pinion 15, rotationally driven either directly or indirectly by the power take-off shaft, rotationally drives the gearwheel 16 of the tubular shaft 17, supported in its movement by the two bearings 18, 19 connected to the fixed structure of the gearbox 10. The tubular shaft 17, through the splined connection 20, 22, drives the rotation of the alternator rotor 11 which is supported in its movement by the splined connection 20, 22 and by the bearing 23 connected to the fixed structure of the gearbox 10. The creation of electricity used to power the turbojet results from the rotation of the end portion 14 of the rotor within the stator 12.

Configured in this way, the drive device makes it possible to avoid transmitting any load or imbalance from the rotor of the alternator 11 to the gears of the gearbox 10. What happens is that certain vibrations are absorbed by the splined connection 20, 22 because this type of connection, which forms a rotational-coupling means, intrinsically offers a certain degree of flexibility. Loads are absorbed overall at the bearing 23 that supports the rotor shaft 13, and are absorbed even better if this bearing is sufficiently large. This bearing 23 exclusively reacts the loads of the rotor of the alternator 11 but no load associated with the gears of the gearbox 10. These loads are transmitted, not to the gears of the gearbox 10, but to the fixed structure of the gearbox, which does not suffer by absorbing such loads.

There is therefore a decoupling between the rotor of the alternator 11 and the gears of the gearbox 10. Furthermore, since the rolling-contact bearings 18, 19 supporting the tubular shaft 17 are decoupled from the rotor of the alternator 11, they are not subjected to the loads thereon. They can therefore be small-sized bearings so as to allow the tubular shaft 17 to rotate with the minimum of friction and the minimum of mass.

In this particular instance and as a preference, the bearing 23 supporting the rotor shaft 13 of the alternator 11 is large, by comparison with the bearings 18, 19 supporting the tubular shaft 17, which are small. The loads on the rotor of the alternator 11 are thus reacted by the bearing 23 supporting the rotor shaft 13, and, what is more, chiefly by this bearing, and by the splined connection 20, 22 in the case of certain vibrations, while the bearings 18, 19 of the tubular shaft 17 are subjected to very little load and therefore run with very little friction.

Furthermore, any loads that there are are generally due to inaccuracies when removing and refitting the alternator. Here, the alternator is fitted by inserting the rotor shaft 13 into the tubular shaft 17 and its support bearing 23, the stator 12 then being mounted around the end 14 of the rotor. The rotor shaft 13 can be inserted within the tubular shaft 17 with no difficulty, any longitudinal inaccuracy having no influence because the insertion of the splined portion 22 of the rotor shaft 13 into the splined portion 20 of the tubular shaft 17 can be incomplete or alternatively can be excessive. This is because the splines do not have to be rigorously face to face in order to transmit movement appropriately. What is more, any angular imprecisions will be absorbed by the splined connection 20, 22, because of its flexibility, or, if not, can be absorbed by the bearing 23 that supports the rotor shaft 13.

Figure 3:
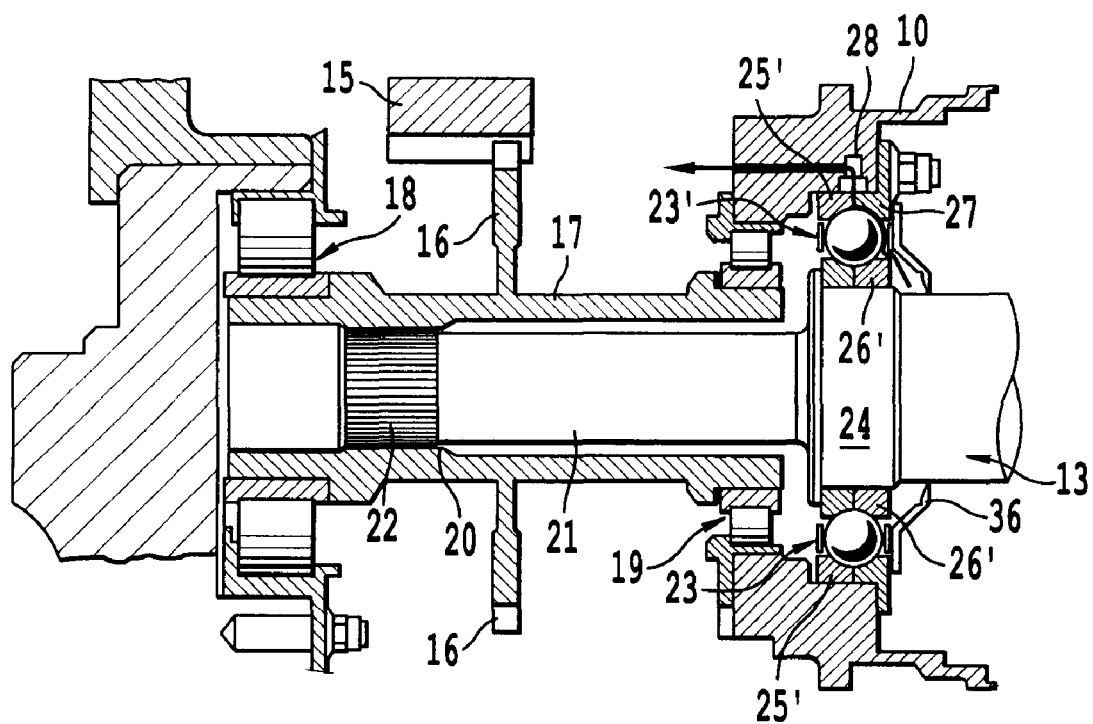
FIG. 3 depicts a schematic cross section of a second embodiment of the device of the invention.

According to a second embodiment, and with reference to FIG. 3, the device for driving the rotor of the alternator 11 is similar in all respects to the one depicted in FIG. 2 except that the bearing 23' supporting the rotor shaft 13 of the alternator 11 is a ball bearing and on its outer ring 25' comprises lubricant drainage means 27. In this particular instance, these means comprise at least one channel 27, formed in the thickness of the outer ring 25' in its central region. As a preference, a plurality of channels 27 are formed and distributed uniformly along the circumference of the outer ring 25'. In order for the lubricant, in this instance oil, to be drained away effectively by the channels 27, the balls of the bearing 23' must not obstruct the inlets to these channels. To achieve this, the bearing 23' is a bearing of the three-point contact type well known to those skilled in the art. A bearing such as this comprises an outer ring 25', the internal surface of which is formed, for example, of two half-ogives or half-rings of a radius greater than that of the balls, which meet on the midline comprising the orifices of the channels 27. Thus, the balls cannot come into contact with the outer ring 25' along this line, but can come into contact therewith only along two distinct lines, each located on one half-ogive or half-ring. Thus, each ball is in contact with the outer ring 25' at two points, and, theoretically, with the inner ring 26 at one point located on its midline. This is what the expression "three-point contact" means.

As a preference, the bearing 23' is a bearing of the "four-point contact" type, that is to say that the inner ring 26' is also a ring with lubricant drainage means (not depicted). These means may be arranged in such a way either to remove the lubricant or, on the other hand, to introduce the lubricant into the bearing 23' as it is removed by the drainage means 27 of the outer ring 25'. In the latter instance, the oil is therefore fed to the inner ring 26' through centrifugal action and removed at the outer ring 25'.

Such four-point contact bearings are described in documents FR 2 740 187 and FR 2 841 305 in the name of the applicant company.

In this way, the lubricant for the bearing 23', fed for example by nozzles, is drained away by the channels 27, the orifices of which are never obstructed by the balls, a lubricant-removal system 28, for example ducts operating on the pumping or suction principle, being provided on the outside of the outer ring to drain the lubricant away. The lubricant could also simply be removed as the result of the rotation of the balls on the outer ring 25' which forces the lubricant into the channels 27 by centrifugal force, without a special-purpose removal system being provided. The lubricant does not therefore build up between the balls and the outer ring 25', thus preventing the balls from slipping on the outer ring 25'. Thus, the risk of damage through slipping of the bearing 23' is avoided and the bearing is thus protected, as is the rotor it supports.

As a result, thanks to the use, for supporting the rotor shaft 13 of the alternator 11, of a bearing 23' with lubricant drainage means 27, the rotor drive device has not only the advantages already set forth, that is to say those of providing decoupling between the rotor and the gears of the gearbox 10, thus preventing loads from being transmitted between these two elements, but also the additional advantage which is that the bearing 23' is protected, thus protecting the rotor of the alternator 11 and therefore the alternator 11. Thus, the gears of the gearbox and also the alternator 11 are protected.

Furthermore, thanks to the lubricant drainage means 27, the balls of the bearing 23' have a lesser tendency to slip on the outer ring 25', making it possible to use a larger-sized bearing 23' which is better able to absorb the loads of the rotor.

Figure 4:
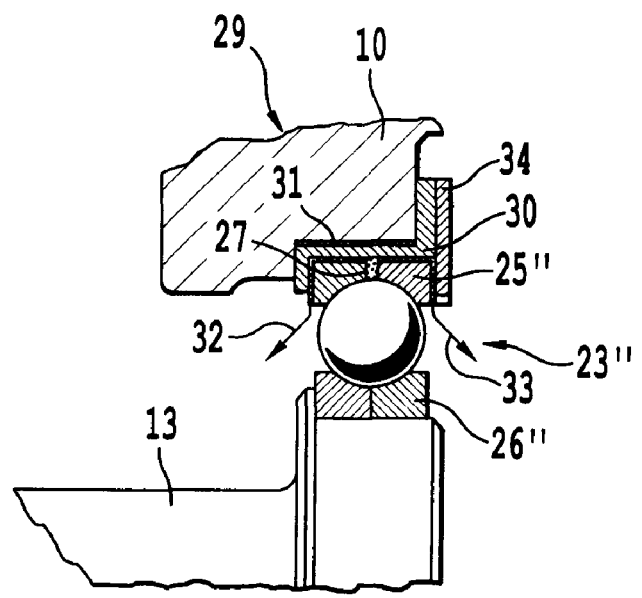
FIG. 4 depicts a schematic cross section of the alternator rotor shaft support bearing in a third embodiment of the device of the invention.

According to a third preferred embodiment and with reference to FIG. 4, the device for driving the rotor of the alternator 11 is in all respects similar to the one set forth in FIG. 3, except that the bearing 23" supporting the rotor shaft 13 of the alternator 11 comprises not only lubricant drainage means 17 on its outer ring 25", but also damping means 29 between the outer ring 25" and the fixed structure of the gearbox 10. These means 29 comprise an oil film 30 arranged between the outer ring 25" and the fixed structure of the gearbox 10. An oil-film damping means such as this is known to those skilled in the art by the term "squeeze film". More specifically, a plate 31 is provided on the outside of the outer ring 25", and this plate leaves a space between it and the outer ring 25", into which space oil from the drainage channels 27 is introduced. It is of little importance that the rate of flow of oil in such channels 27 is not great, because the essential feature is that there be a certain pressure at the oil film 30. As indicated by the arrows 32, 33, the oil can be removed via spaces formed on the edges of the outer ring 25", on each side of this ring 25". Alternatively, other removal means could be provided, for example toward the outside of the outer ring 25", comparable with the removal means 28 in the embodiment of FIG. 3.

This oil film 30 forms a damping means for the bearing 23". A device such as this offers the additional advantage of damping some of the loads on the bearing 23" and of protecting it still further together, therefore, with the rotor of the alternator 11. The oil film 30 is supplied by the drainage channels 27 and is therefore simple to implement. It thus further increases the extent to which the rotor of the alternator 11 and the gearbox 10 are decoupled, in as far as not only are the gears of the gearbox 10 decoupled and therefore isolated from the rotor, but the oil film 30 also isolates and therefore decouples the rotor from the fixed structure of the gearbox 10. Thus, both the gears and the fixed structure of the gearbox 10 are isolated from the rotor.

Here there is a plate 34 preventing the rotation of the outer ring 25", fixed against this ring 25" and the fixed structure of the gearbox 10, on the same side as the alternator 11, so as to prevent any rotation of the ring 25" about the axis of the rotor of the alternator 11.

The inner ring 26" may be of the conventional type or may also comprise lubricant supply means, for example being formed as two half-rings.

Figure 5:
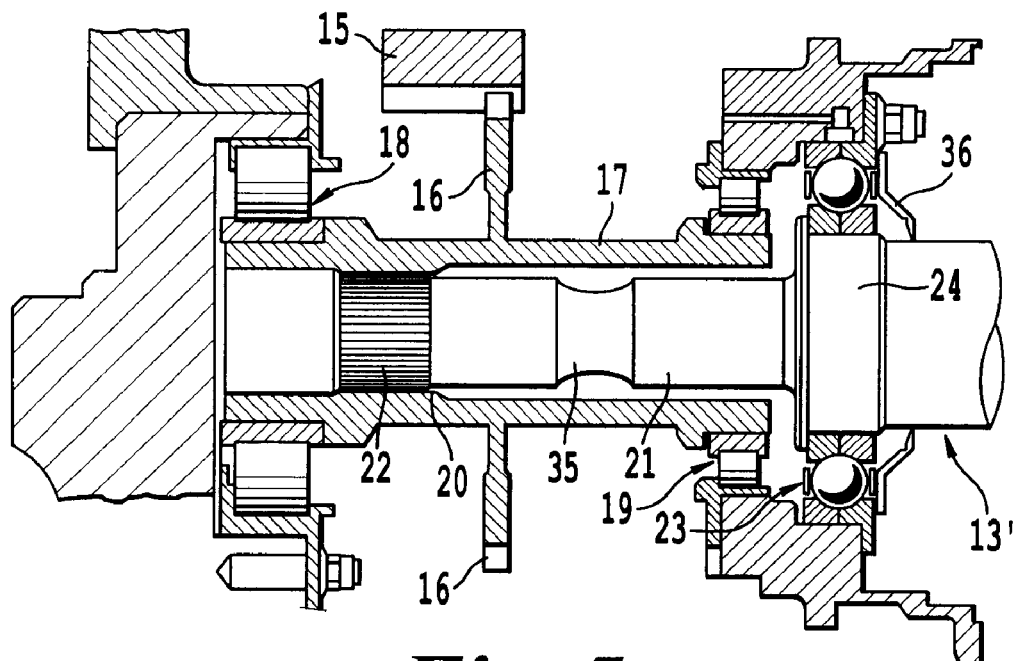
FIG. 5 depicts a schematic cross section of a fourth embodiment of the device of the invention.

According to a fourth preferred embodiment and with reference to FIG. 5, the device for driving the rotor of the alternator 11 is in all respects similar to that of one of the other preceding embodiments, the rotor shaft 13' of the alternator 11 comprising an additional feature. In this embodiment, the rotor shaft 13' of the alternator 11 comprises, in its shaft portion 21 extending within the tubular shaft 17, a weakened portion 35, here of smaller diameter, designed as a deliberate weak link 35. Thus, if excessive loads are applied to the rotor and therefore to its shaft 13', the deliberate weak link 35 breaks and completely decouples the rotor from the tubular shaft 17 and therefore from the gears of the gearbox 10. This then is an additional safety feature making it possible to ensure that the gearbox 10 is not damaged if excessive loads are applied to the rotor of the alternator 11. This deliberate weak link 35 is engineered according to the maximum loads that the person skilled in the art deems acceptable to be applied to the rotor of the alternator 11, so that it breaks if excessive loads above the load threshold thus defined are applied.

Figure 6:
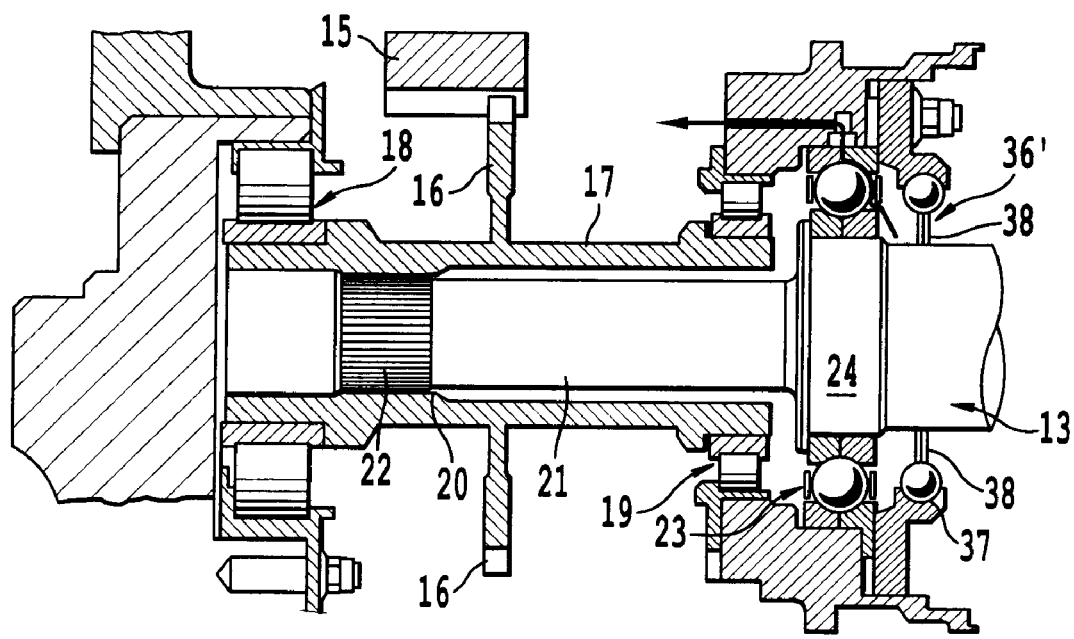
FIG. 6 depicts a schematic cross section of a fifth embodiment of the device of the invention.

According to a fifth preferred embodiment and with reference to FIG. 6, the device for driving the rotor of the alternator 11 is in all respects similar to that of one of the other preceding embodiments except that the seal between the device for driving the rotor of the alternator 11 and the alternator 11 itself is not a deflector 36 as in the preceding embodiments, but a brush seal 36'. A brush seal 36' such as this comprises a ring 37, fixed to the fixed structure of the gearbox 10, near the bearing 23, between the bearing 23 and the alternator 11, and from which carbon or ceramic bristles 38 extend inward, these bristles for example being very close together. A brush seal 36' such as this is mounted statically on the fixed structure of the gearbox 10, the bristles 38 being in contact with the rotor shaft 13 (they are longer than the distance between the ring 37 and the surface of the rotor shaft 13). This then better avoids any imbalance appearing on the rotor as a result of the presence of oil between the rotor and the stator 12 of the alternator 11, thus further improving the operation of the device for driving the alternator 11, which is subjected to lower loads.

The various embodiments which have been set forth may be combined with one another, individually, in part or in their entirety, because it has been seen that each different embodiment relates to a separate part. The advantages of each embodiment can be added together and combined with the same objective of decoupling and protecting the gears of the gearbox 10 and the rotor of the alternator 11, and of reducing the loads to which they are subjected.

The invention claimed is:

1. A device for driving the rotor of an auxiliary mounted on a turbine engine auxiliaries support comprising:
  a rotor shaft connected to the auxiliary at a first end of the rotor shaft;
  a pinion which drives the rotor shaft;
  a tubular shaft driven by the pinion;
  a first bearing which is secured to the auxiliaries support and supports the tubular shaft at a first end of the tubular shaft;
  a second bearing which is secured to the auxiliaries support and supports the tubular shaft at a second end of the tubular shaft; and
  at least one third bearing which is secured to the auxiliaries support and supports the rotor shaft,
  wherein the rotor shaft is disposed inside of and coaxial with the tubular shaft and a rotational-coupling device is formed between the rotor shaft and the tubular shaft at a second end of the rotor shaft and the first end of the tubular shaft, and
  wherein a middle portion of the rotor shaft between the first end and the second end of the rotor shaft is directly supported by the at least one third bearing.

2. The device as claimed in claim 1, wherein the auxiliary is an alternator comprising a stator fixed to the auxiliaries support.

3. The device as claimed in claim 1 wherein the rotational-coupling device includes splines provided on the second end of the rotor shaft and the first end of the tubular shaft.

4. The device as claimed in claim 1 wherein the third bearing is a ball bearing and comprises a lubricant drainage device on an outer ring of the ball bearing.

5. The device as claimed in claim 4, wherein the third bearing is a three-point contact or four-point contact bearing.

6. The device as claimed in claim 4, further comprising an oil-film damping device arranged on the outer ring of the third bearing.

7. The device as claimed in claim 1, wherein the first bearing and the second bearing are smaller in size than the third bearing.

8. The device as claimed in claim 1, wherein a brush seal is arranged, adjacent to the third bearing, on the same side as the auxiliary, so as to seal the auxiliary against lubricant used in the device.

9. The device as claimed in claim 1 wherein the rotor shaft comprises a weak link portion which breaks if excessive loads are applied to the rotor.

10. An auxiliaries support for a turbine engine, comprising gears driving the drive device as claimed in claim 1.

11. A turbine engine comprising a shaft, and a shaftpower take-off device which drives the gears of the auxiliaries support of claim 10.

12. The device as claimed in claim 1, wherein a diameter of the middle portion of the rotor shaft directly supported by the at least one third bearing is larger than a diameter of the first end of the rotor shaft and a diameter of the second end of the rotor shaft.

* * * * *